UNITED STATES PATENT OFFICE.

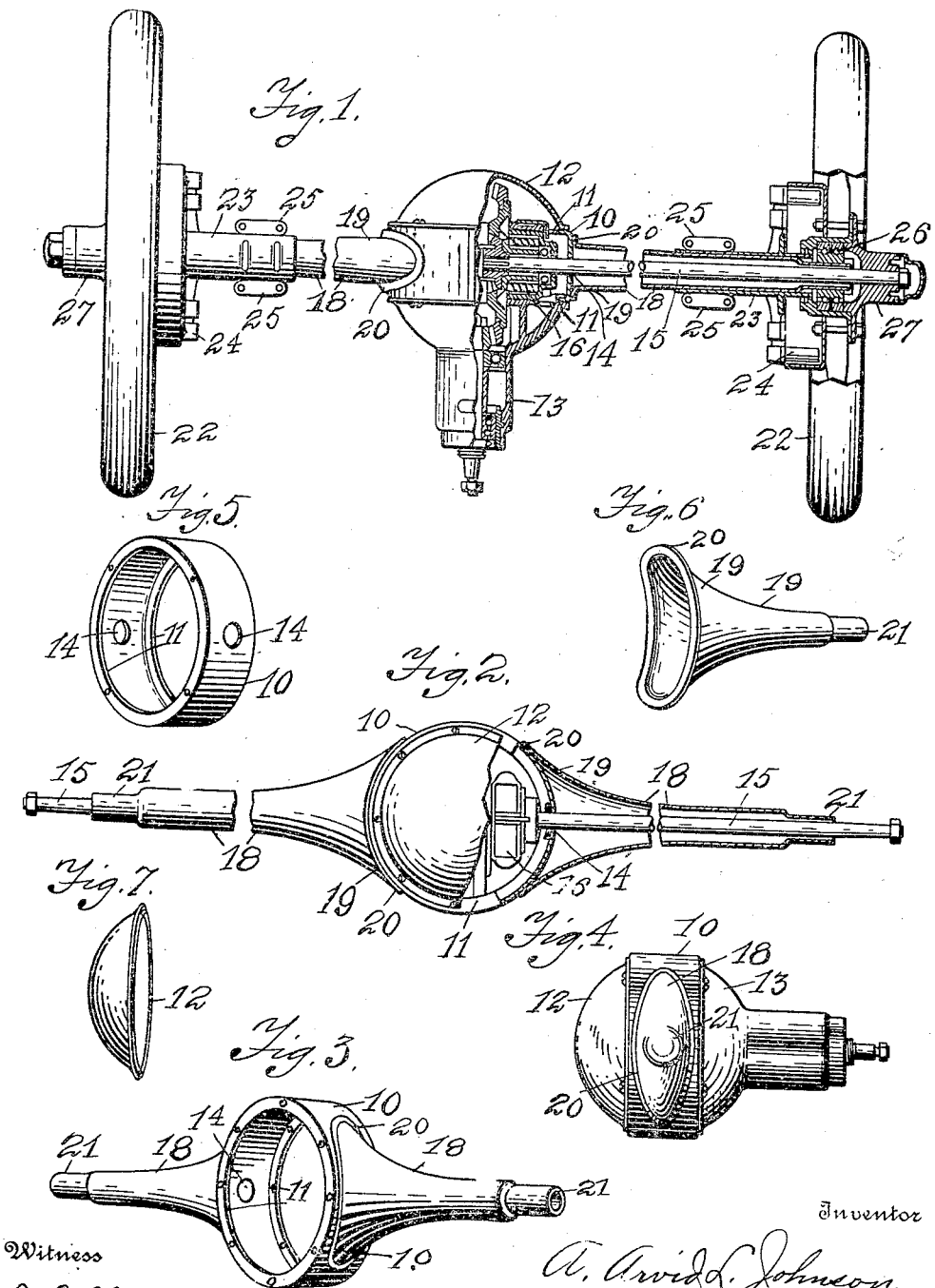

AXEL ARVID L. JOHNSON, OF JAMESTOWN, NEW YORK.

GEAR AND AXLE HOUSING.

1,291,009.  Specification of Letters Patent.  Patented Jan. 14, 1919.

Application filed June 12, 1918. Serial No. 239,526.

*To all whom it may concern:*

Be it known that I, AXEL ARVID L. JOHNSON, a citizen of the United States, residing at the city of Jamestown, in the county of Chautauqua and State of New York, have invented certain new and useful Improvements in Gear and Axle Housings, of which the following, taken in connection with the accompanying drawings, is a specification.

The invention relates to housings for axles and particularly the driving gear and axle of an automobile; and the object of the improvement is to provide a simple and durable gear and axle housing which may be stamped from the sheet metal by suitable forming dies so that the interior of the gearing box or grease container is separated from the axle housings on each side, and said axle housings are attached to the periphery of opposite sides of said gearing box, the manner of making and shaping the housing being such as to form an exceedingly strong and efficient construction at low cost; and the invention consists in the novel features and combination hereinafter set forth and claimed.

In the drawings, Figure 1 is a top plan view of the driving axle of an automobile with the wheels attached thereto, one-half of the same being shown in section to make clear the placing and arrangement of the different parts; and Fig. 2 is a rear plan view of the same with the rear cover partly broken away and the adjacent axle housing in section. Fig. 3 is a perspective view of the axle housing with the front and rear covers removed showing the manner of constructing the same. Fig. 4 is a sidewise elevation of the housing with the front and rear covers in place showing the end view of the axle housing as it is attached to one side of the gear housing. Fig. 5 is a perspective view of the gear housing before the attachment of the axle housings; and Fig. 6 is a perspective view of one of the axle housings showing the preferred form of the same before attachment to the gear box or housing; and Fig. 7 is a perspective view of the removable rear cap or cover for the gear box.

Like characters of reference refer to corresponding parts in the several views.

The numeral 10 designates the metallic ring gear box, which is preferably struck from sheet metal and has the preferably inturned flanges 11 on each side for the attachment of the rear cap 12 and front connective gear carrier cover 13.

The central gear box 10 has the openings 14 through each side for the round axle shafts 15, the openings 14 fitting the shafts 15 so that the box 10 may act as a grease box for the driving gearing 16 to which gearing the axle shafts 15 are also connected so as to turn the wheels 22. The cap 12 and cover 13 inclose the open sides 17 of the preferably inwardly flanged ring gear box 10 thereby making a closed box which may be grease packed to lubricate the driving gearing 16.

The housings 18 for the axle shafts 15 are preferably trumpet shaped with the larger end 19 flattened to an elliptical form with the curved flange 20 to fit the periphery of the box 10 for attachment thereto preferably by spot welding, in such position that the holes in the outer ends 21 of the housings 18 are in alinement with one another and with the openings 14 in the grease box 10 so that the axles 15 may be attached to the driving gear 16 in perfect alinement in their connection to the wheels 22. The axle housing 18 is inclosed at its outer end within the tubular housing 23 for the brakes 24 which housing 23 has the flanges 25 for attaching the supporting springs for the automobile body.

It is apparent that this simply constructed housing for the driving gear and axle of an automobile may be struck from the sheet metal by suitable forming dies, the central round grease box 10 being shaped with one flange by the one die and then the flange for the opposite edge turned by a second die. Said flanges 11 may be turned out but are preferably turned in to give a smooth exterior. The attachment of the axle housings 18 to the gear housing 10 by spot welding makes the three main parts of the housing substantially integral at an exceedingly low cost. At the same time the trumpet shaped axle housings 18 are braced and assist in bracing the cylindrical gear box 10. The openings 14 may be packed around the axle shafts 15 if desired. The exterior of each of the tubular ends 21 forms a strong mounting surface for the ball bearings 26 within the wheel hub 27 so that with the attached tubular housings 23 over the outer ends of the axle housings 18, a peculiarly strong mounting is made for the wheels 22 at low cost.

The front gear carrier cover 13 and rear cover or cap 12 are preferably removably attached by means of screws so as to form an efficient means of approach to the driving gear 16 for repair or for repacking the box 10 with grease. There is rarely need of removal for said gear carrier cover 13 since the gearing 16 and the parts connected therewith within the cover 13 may be usually approached through the rear cap 12.

The struck up cylindrical shaped ring 10 may be made in different shapes but is preferably made round and when the rear cover 12 and gear carrier cover 13 are attached thereto the combinations makes an exceedingly strong grease container. The flattened axle shaft housings 18 with their curved inner ends to fit the periphery of the struck up ring 10 form a compound truss construction of great strength when the three parts are welded together as hereinbefore described. The cylindrical ring gear box 10 is necessarily large to receive the driving gears 19 and when trussed by the attached axle shaft housings 18 they are of sufficient strength so that a light gage sheet metal of lesser quality can be used therefor. The axle shaft housings 18 are preferably made of a better grade of steel or other metal of sufficient thickness so that the small outer tubular sections 21 are of ample strength to carry the imposed loads thereon.

I claim as new:—

1. A gear and axle housing comprising a struck up sheet metal integral ring gear housing, detachable front and rear covers for said ring gear housing, sheet metal struck up axle housings attached to the outer sides of said ring gear housing on the opposite sides thereof to brace the same, said ring gear housing having close fitting openings in its opposite sides to receive the axle shafts therethrough and making a closed grease box for the driving gear.

2. A gear and axle housing comprising a sheet metal integral ring gear housing having inturned flanged edges, front and rear covers detachably attached to said inturned flanged edges to form a closed grease box, tubular axle housing parts having enlarged flanged inner ends conformably shaped to fit and be welded to the periphery of said ring gear housing to brace the opposite outer sides thereof, said ring gear housing having openings in the opposite sides thereof to fit the axles.

3. A gear and axle housing comprising a sheet metal struck up cylindrical gear housing and grease box having inturned flanged edges, a front cover removably attached to one of said inturned flanges of said cylindrical gear housing, a rear cover removably attached to the other inturned flange of said cylindrical gear housing to form a grease box and housing for the driving gear, an axle housing attached to the periphery of each side of said cylindrical gear box, one end of each of said axle housings enlarged and curved to fit said periphery of said cylindrical gear box for attachment thereto, and the outer ends of each of said axle housings shaped in a cylindrical tube to rotatably fit the axle, said cylindrical gear box having openings in line with said outer ends of said axle housings to receive the axle shafts therethrough.

In testimony whereof I have affixed my signature in the presence of two witnesses.

A. ARVID L. JOHNSON.

Witnesses:
H. A. SANDBERG,
A. W. KETTLE.